(12) United States Patent
Lim

(10) Patent No.: US 9,400,580 B2
(45) Date of Patent: Jul. 26, 2016

(54) TOUCH PANEL AND METHOD OF FABRICATING THE SAME

(71) Applicant: LG Display Co., Ltd., Seoul (KR)

(72) Inventor: Kwang-Su Lim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/548,059

(22) Filed: Nov. 19, 2014

(65) Prior Publication Data

US 2015/0185915 A1 Jul. 2, 2015

(30) Foreign Application Priority Data

Dec. 30, 2013 (KR) ........................ 10-2013-0167615

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0418* (2013.01); *G06F 2203/04103* (2013.01); *G06F 2203/04111* (2013.01)

(58) Field of Classification Search
CPC ..... G06F 3/0412; G06F 3/044; G06F 3/0418; G06F 3/041; G06F 2203/04111; G06F 2203/04103
See application file for complete search history.

(56) References Cited

U.S. PATENT DOCUMENTS

| | | | | |
|---|---|---|---|---|
| 2011/0256307 | A1* | 10/2011 | Kim | G06F 3/044 427/79 |
| 2014/0168109 | A1* | 6/2014 | Kang | G06F 3/044 345/173 |

* cited by examiner

*Primary Examiner* — David Tung
(74) *Attorney, Agent, or Firm* — Birch, Stewart, Kolasch & Birch, LLP

(57) ABSTRACT

A touch panel can include a substrate; driving lines on the substrate along a first direction, each of the driving lines including first driving electrodes, second driving electrodes and first connecting patterns; and sensing lines on the substrate along a second direction, each of the sensing lines including first sensing electrodes, second sensing electrodes and second connecting patterns, wherein each of the first connecting patterns connects the first driving electrodes adjacent thereto, and the second driving electrodes overlap and contact the first driving electrodes, and wherein each of the second connecting patterns connects the first sensing electrodes adjacent thereto, and the second sensing electrodes overlap and contact the first sensing electrodes.

16 Claims, 16 Drawing Sheets

TOUCH PANEL AND METHOD OF FABRICATING THE SAME

CROSS REFERENCE TO RELATED APPLICATIONS

The present application claims the priority benefit of Korean Patent Application No. 10-2013-0167615 filed in the Republic of Korea on Dec. 30, 2013, which is hereby incorporated by reference in their entirety.

BACKGROUND OF THE INVENTION

1. Field of the Invention

The present disclosure relates to a touch display device, and more particularly, to a touch panel for a touch display device and a method of fabricating the same.

2. Description of Related Art

With rapid development of information technologies, display devices for displaying a large amount of information have been promptly developed. More particularly, flat panel display (FPD) devices having a thin profile, light weight and low power consumption such as organic electroluminescent display (OLED) devices and liquid crystal display (LCD) devices have been actively pursued and widely applied.

Recently, touch display devices, which include a touch panel attached on a display panel, have been spotlighted.

The touch display devices, which may be referred to as touch screens, are used as an output means for displaying images and also used as an input means for receiving instructions from a user. Namely, when a user touches the touch panel while watching an image displayed by the display panel, the touch panel detects location information about the touch point and compares the detected location information with location information of the image, thereby performing an instruction from the user.

Touch panels are classified into various types according to different methods of detecting a touch input of a user, including resistive type, capacitive type, infrared type, and surface acoustic wave type.

Among these types, capacitive type touch panels have been widely used because of their superior durability, long life time, facile multi-touch, and high transmittance.

The capacitive type touch panels are classified into mutual capacitance type and self-capacitance type. In the mutual capacitance type, driving lines and sensing lines are independently formed, and changes in capacitance between the driving lines and the sensing lines are detected according to touches. In the self-capacitance type, voltages are applied to touch electrodes, which are independently formed in respective regions, and changes in capacitance of the touch electrodes are detected according to touches.

A touch display device including a touch panel may be fabricated by attaching an additional touch panel to a display panel or by forming elements of a touch panel on a substrate of a display panel such that the touch panel is one united body with the display panel.

Hereinafter, a touch display device including a mutual capacitance type touch panel will be described with reference to FIG. 1.

FIG. 1 is a schematic view illustrating an in-cell or on-cell type touch display device with an integrated touch panel according to the related art. Alternatively, the related art touch display device may include an add-on type touch panel. Here, an organic light-emitting diode display device is used as a display panel, and a touch panel is a mutual capacitance type.

In FIG. 1, the related art touch display device includes a display panel 10, a touch panel 30 and a polarizer 40. A first surface of the touch panel 30 is attached to the display panel 10 by an adhesive layer 20, and a second surface of the touch panel 30 is attached to the polarizer 40.

The display panel 10 includes a first substrate 12 on which a thin film transistor and an organic light-emitting diode including a cathode electrode 14 are formed. An encapsulation layer 16 is formed on the cathode electrode 14.

The touch panel 30 includes a second substrate 32, first lines 34a and second lines 34b on a surface of the second substrate 32, and an insulating layer 36 covering the first and second lines 34a and 34b.

Here, light emitted from the organic light-emitting diode is outputted to the outside through the cathode electrode 14, the touch panel 30 and the polarizer 40, thereby displaying an image.

In the meantime, each first line 34a and each second line 34b cross each other to form a mutual capacitor. When a user touches the touch display device, mutual capacitance of the mutual capacitor varies, and a touch point is detected from the varied mutual capacitance.

In addition, in the related art touch display device, since the first lines 34a and the second lines 34b are disposed close to the cathode electrode 14, parasitic capacitance is generated due to the cathode electrode 14. The parasitic capacitance changes due to noise from an image signal, which is applied to the cathode electrode 14, and the touch performance decreases.

The parasitic capacitance varies according to a thickness of the adhesive layer 20. As the thickness of the adhesive layer 20 becomes thin, a distance between the first and second lines 34a and 34b and the cathode electrode 14 becomes short, and the parasitic capacitance increases. Thus, the touch performance rapidly decreases. For instance, the signal to noise ratio (SNR) is 35 dB when the thickness of the adhesive layer 20 is 35 micrometers, and the SNR is 25 dB when the thickness of the adhesive layer 20 is 10 micrometers. Accordingly, the thinner the thickness of the adhesive layer 20 is, the larger the noise is, and the touch performance is reduced.

SUMMARY OF THE INVENTION

Accordingly, the present invention is directed to a touch panel and a method of fabricating the same that substantially obviates one or more of the problems due to limitations and disadvantages of the related art.

An object of the present disclosure is to provide a touch panel and a method of fabricating the same that minimizes the influence of the parasitic capacitance and provides strong touch performance against signal noise by increasing the mutual capacitance.

Another object of the present disclosure is to provide a touch panel and a method of fabricating the same that improve visibility.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a touch panel including a substrate; driving lines on the substrate along a first direction, each of the driving lines including first driving electrodes, second driving electrodes and first connecting patterns; and sensing lines on the substrate along a second direction, each of the sensing lines including first sensing electrodes, second sensing electrodes and second connecting patterns, wherein each of the first connecting patterns connects the first driving electrodes adjacent thereto, and the second driving electrodes overlap and contact the first driving electrodes, and wherein each of the second connecting patterns connects the first sensing electrodes adjacent thereto, and the second sensing electrodes overlap and contact the first sensing electrodes.

In another aspect, a method of fabricating a touch panel includes forming first driving electrodes, first sensing electrodes, and first connecting patterns on a substrate; forming a first insulating layer on the first driving electrodes, the first sensing electrodes and the first connecting patterns, the first insulating layer including first contact holes exposing the first driving electrodes and second contact holes exposing the first sensing electrodes; and forming second driving electrodes, second sensing electrodes and second connecting patterns on the first insulating layer, wherein each of the first connecting patterns connects adjacent first driving electrodes along a first direction, and the second driving electrodes overlap and contact the first driving electrodes, and wherein each of the second connecting patterns connects adjacent first sensing electrodes along a second direction, and the second sensing electrodes overlap and contact the first sensing electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
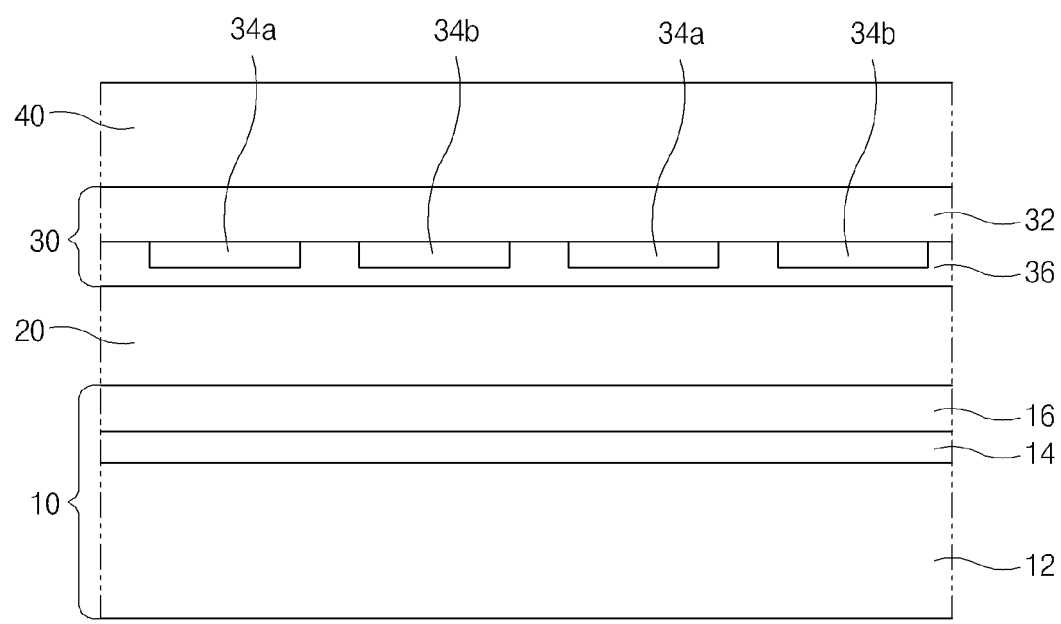
FIG. 1 is a schematic view illustrating an in-cell or on-cell type touch display device with an integrated touch panel according to the related art.
Figure 2:
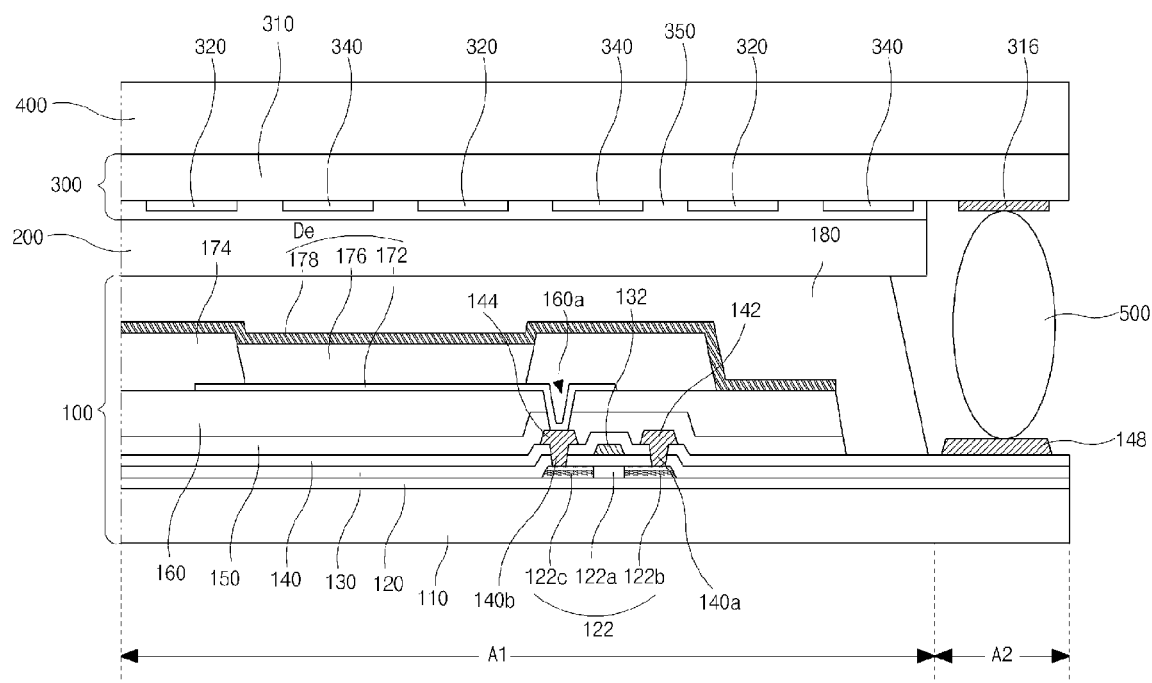
FIG. 2 is a cross-sectional view illustrating a touch display device according to an embodiment of the present invention.

FIG. 2 is a cross-sectional view schematically illustrating a touch display device according to an embodiment of the present invention.

In FIG. 2, the touch display device according to an embodiment of the present invention includes a display panel 100, a touch panel 300 and a polarizer 400. The display panel 100 and the touch panel 300 can be attached to each other by an adhesive layer 200.

In addition, another adhesive layer may be disposed between the touch panel 300 and the polarizer 400. Alternatively, the touch panel 300 may be formed directly on the polarizer 400.

A display area A1 and a non-display area A2 can be defined in the touch display device of the present invention. An image is displayed in the display area A1, and the display area A1 is surrounded by the non-display area A2.

More particularly, the display panel 100 includes a first substrate 110. A buffer layer 120 is formed on a substantially entire surface of the first substrate 110. The first substrate 110 may be formed of glass, plastic such as polyethylene terephthalate (PET), or polyimide. The buffer layer 120 may be formed of an inorganic insulating material such as silicon oxide ($SiO_2$) or silicon nitride ($SiN_x$). Alternatively, the buffer layer 120 may be omitted.

A semiconductor layer 122 is formed on the buffer layer 120 in the display area A1. The semiconductor layer 122 includes an active area 122a, a source area 122b and a drain area 122c. The semiconductor layer 122 may be formed of polycrystalline silicon, and the source and drain areas 122b and 122c may be doped with impurities. Alternatively, the semiconductor layer 122 may be formed of oxide semiconductor, and in this case, the source and drain areas 122b and 122c do not include impurities.

A gate insulating layer 130 is formed on the semiconductor layer 122. The gate insulating layer 130 may be formed of an inorganic insulating material such as silicon oxide ($SiO_2$) or silicon nitride ($SiN_x$). As shown in FIG. 2, the gate insulating layer 130 may be formed on a substantially entire surface of the first substrate 110. Alternatively, the gate insulating layer 130 may be patterned to have a shape corresponding to the active area 122a.

A gate electrode 132 is formed on the gate insulating layer 130 corresponding to the active area 122a.

An inter insulating layer 140 is formed on the gate electrode 132 over the first substrate 110. The inter insulating layer 140 includes first and second semiconductor contact holes 140a and 140b exposing the source and drain areas 122b and 122c, respectively, with the gate insulating layer 130. On the other hand, when the gate insulating layer 130 is patterned to have a shape corresponding to the active area 122a, the first and second semiconductor contact holes 140a and 140b are formed only in the inter insulating layer 140. The inter insulating layer 140 may be formed of an inorganic insulating material such as silicon oxide ($SiO_2$) or silicon nitride ($SiN_x$) or an organic insulating material such as benzocyclobutene or photo acryl.

A source electrode 142 and a drain electrode 144 are formed on the inter insulating layer 140. The source and drain electrodes 142 and 144 contact the source and drain areas 122b and 122c through the first and second semiconductor contact holes 140a and 140b, respectively.

In addition, a display pad 148 can be formed on the inter insulating layer 140 in the non-display area A2. The display pad 148 is formed of the same material as the source and drain electrodes 142 and 144.

A first passivation layer 150 and a second passivation layer 160 are sequentially formed on the source and drain electrodes 142 and 144. The first and second passivation layers 150 and 160 may be disposed only in the display area A1. The second passivation layer 160 can have a flat surface. The first and second passivation layers 150 and 160 have a drain contact hole 160a exposing the drain electrode 144. The first passivation layer 150 may be formed of an inorganic insulating layer such as silicon oxide ($SiO_2$) or silicon nitride (SiNx), and the second passivation layer 160 may be formed of an organic insulating material such as benzocyclobutene (BCB) or photo acryl.

A first electrode 172 is formed on the second passivation layer 160. The first electrode 172 contacts the drain electrode 144 through the drain contact hole 160a. The first electrode 172 may be formed of a conductive material having relatively high work function, and for example, the first electrode 172 may be formed of a transparent conductive material such as indium tin oxide or indium zinc oxide.

A bank layer 174 is formed on the first electrode 172. The bank layer 174 is formed of an insulating material. The bank layer 174 covers edges of the first electrode 172 and exposes a central portion of the first electrode 172.

An organic light-emitting layer 176 is formed on the first electrode 172 exposed by the bank layer 174. The organic light-emitting layer 176 may have a multi-layered structure that a hole transporting layer, a light-emitting material layer and an electron transporting layer are sequentially formed on the first electrode 172. The organic light-emitting layer 176 may further include a hole injecting layer under the hole transporting layer and an electron injecting layer on the electron transporting layer.

A second electrode 178 is formed on the organic light-emitting layer 176 over the display area A1. Here, the second electrode 178 may be formed of a conductive material having relatively low work function, and for example, may be formed of a metallic material.

Also, in order to increase light efficiency, a capping layer of an organic/inorganic material having a relatively high refractive index may be formed on the second electrode 178.

The first electrode 172, the organic light-emitting layer 176 and the second electrode 178 form an organic light-emitting diode De. The first electrode 172 may act as an anode, and the second electrode may function as a cathode. Here, the display panel 100 of the touch display device may be a top emission type organic light-emitting diode display device in which light emitted from the organic light-emitting layer is outputted to the outside through the second electrode 178. That is, a reflection layer may be formed under the first electrode 172, and the second electrode 178 may have a relatively thin thickness such that light passes through the second electrode 178 and is outputted to the outside.

A sealing layer 180 is formed on the second electrode 178. The sealing layer 180 may be formed in the display area A1 and protect the elements in the display area A1 by preventing permeation of moisture or oxygen from the outside. The sealing layer 180 may include a structure of inorganic layer/ organic layer/inorganic layer.

The adhesive layer 200 is disposed on the sealing layer 180. The adhesive layer 200 may be formed of a liquid phase adhesive or a pressure sensitive adhesive. For example, the adhesive layer 200 may include a thermosetting adhesive.

The touch panel 300 is disposed on the adhesive layer 200. The touch panel 300 includes a second substrate 310. The second substrate 310 may be formed of glass, plastic such as polyethylene terephthalate (PET), or polyimide.

A plurality of first lines 320 and a plurality of second lines 340 are formed on a first surface of the second substrate 310 facing the adhesive layer 200 in the display area A1. The plurality of first lines 320 extend along a first direction, and the plurality of second lines 340 extend along a second direction crossing the first direction. The first lines 320 and the second lines 340 form mutual capacitors.

The first lines 320 may be referred to as driving lines or driven lines, and the second lines 340 may be referred to as sensing lines or receive lines.

A protection layer 350 is formed on the first lines 320 and the second lines 340 over the first surface of the second substrate 310 and covers the first lines 320 and the second lines 340. The protection layer 350 contacts the adhesive layer 200. The protection layer 350 is disposed in the display area A1. The protection layer 350 may be formed of an inorganic insulating material such as silicon oxide ($SiO_2$) or silicon nitride (SiNx) or an organic insulating material such as benzocyclobutene (BCB) or photo acryl.

In addition, a touch pad 316 is formed on the first surface of the second substrate 310 in the non-display area A2, and the touch pad 316 corresponds to the display pad 148. The touch pad 316 is electrically connected to the first lines 320 or the second lines 340. In addition, the touch pad 316 is electrically connected to the display pad 148 through a connecting means 500. The connecting means 500 may be an anisotropic conductive film.

The polarizer 400 is disposed on a second surface of the second substrate 310 of the touch panel 300. The polarizer 400 may be a circular polarizer transmitting circularly polarized light and may include a linear polarizer and a quarter wave plate.

Also, a cover substrate may be attached to the polarizer 400 by an optically clear adhesive. The cover substrate may be formed of plastic.

In the touch display device of the present invention, the first lines 320 and the second lines 340 of the touch panel can have a double-layered structure and form mutual capacitors connected to each other in parallel. Accordingly, mutual capacitance of the mutual capacitors for sensing a touch can be increased, and the influence of parasitic capacitance due to the second electrode 178 can be minimized. Thus, the touch performance can be made stronger against signal noise.

Hereinafter, the touch panel according to an embodiment of the present invention will be described in detail with reference to accompanying drawings.

Figure 3:
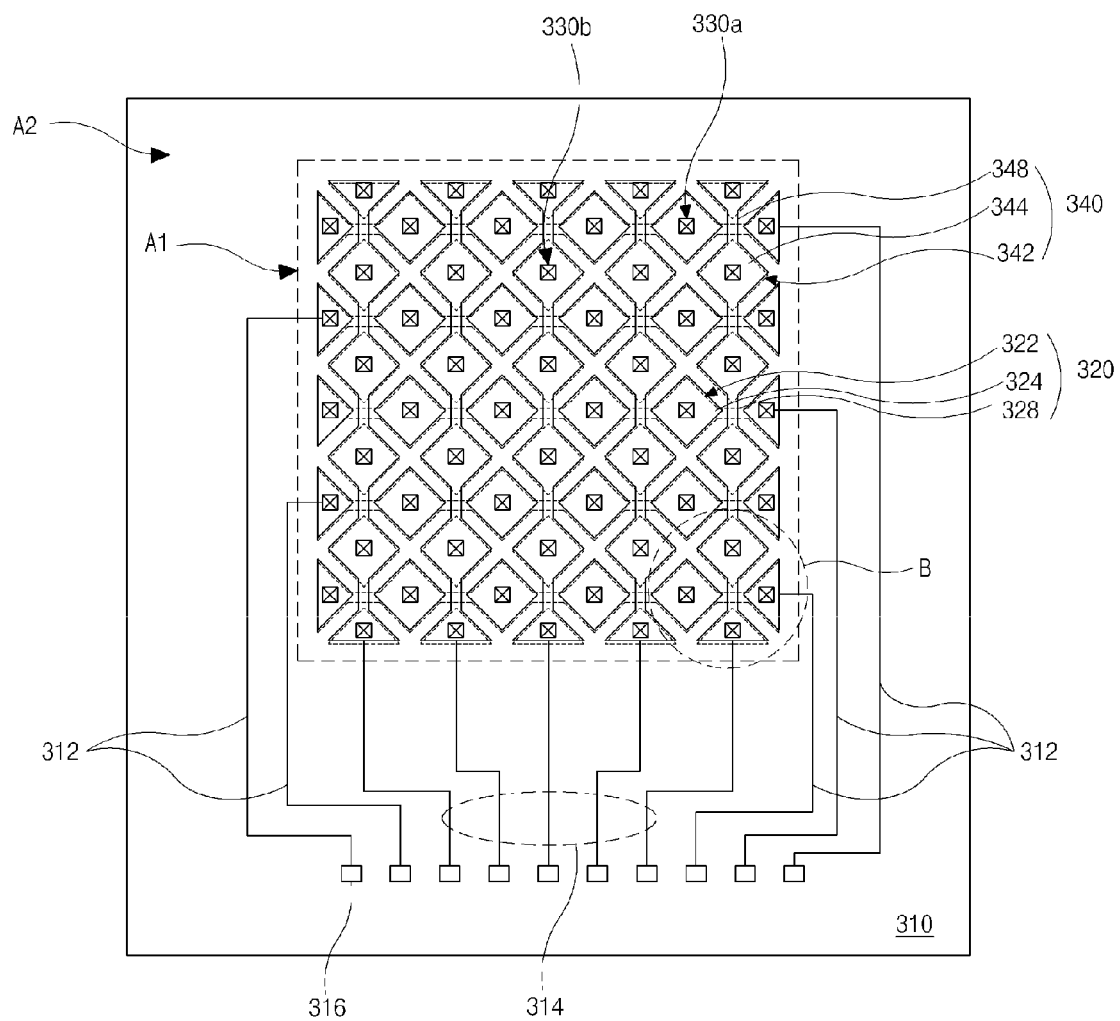
FIG. 3 is a plan view illustrating a touch panel according to an embodiment of the present invention.
Figure 4A:
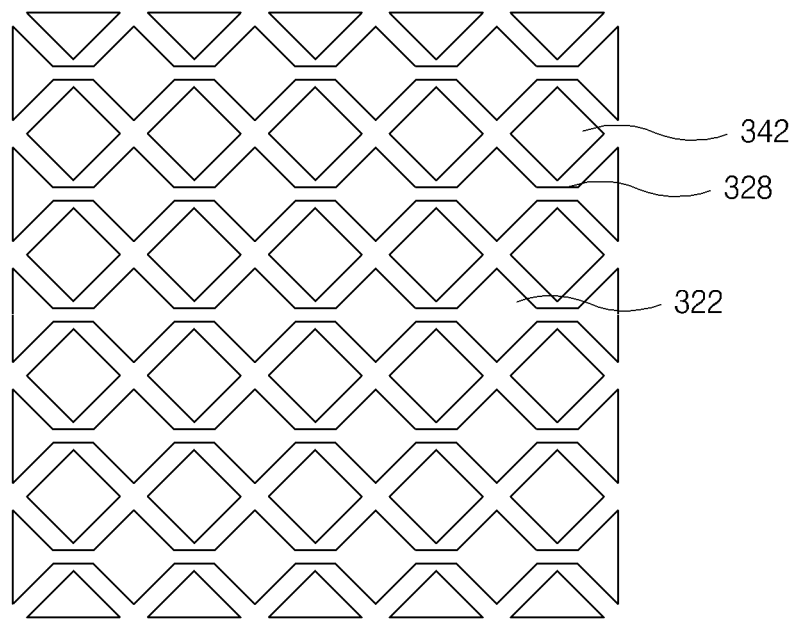
FIG. 4A is a plan view illustrating a first electrode layer of a touch panel according to an embodiment of the present invention.
Figure 4B:
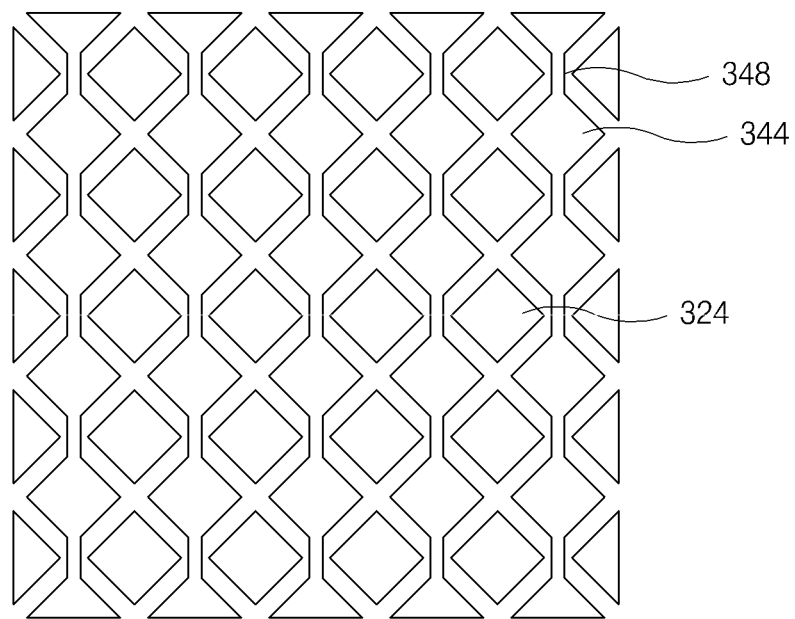
FIG. 4B is a plan view illustrating a second electrode layer of the touch panel according to an embodiment of the present invention.

FIG. 3 is a plan view schematically illustrating a touch panel according to an embodiment of the present invention. FIG. 4A is a plan view schematically illustrating a first electrode layer of the touch panel according to an embodiment of the present invention, and FIG. 4B is a plan view schematically illustrating a second electrode layer of the touch panel according to an embodiment of the present invention.

In FIG. 3, the touch panel includes a substrate 310, and a display area A1 and a non-display area A2 are defined on the substrate 310. An image is displayed in the display area A1, and the display area A1 is surrounded by the non-display area A2.

A plurality of driving lines 320 and a plurality of sensing lines 340 are formed in the display area A1 along a first direction and a second direction, respectively.

Each driving line 320 includes a plurality of first driving electrodes 322, a plurality of second driving electrodes 324, and a plurality of first connecting patterns 328. The plurality of first driving electrodes 322 and the plurality of second driving electrodes 324 overlap each other with an insulating layer interposed therebetween and contact each other through first contact holes 330a, respectively. The plurality of first connecting patterns 328 are formed on the same layer as the plurality of the first driving electrodes 322 and connect adjacent first driving electrodes 322 along the first direction. The first driving electrodes 322 and the first connecting patterns 328 may be formed in one-united body.

Each sensing line 340 includes a plurality of first sensing electrodes 342, a plurality of second sensing electrodes 344, and a plurality of second connecting patterns 348. The plurality of first sensing electrodes 342 and the plurality of second sensing electrodes 344 overlap each other with an insulating layer interposed therebetween and contact each other through second contact holes 330b, respectively. The plurality of second connecting patterns 348 are formed on the same layer as the plurality of the second sensing electrodes 344, connect adjacent second sensing electrodes 344 along the second direction, and cross the plurality of first connecting patterns 328. The second sensing electrodes 344 and the second connecting patterns 348 may be formed in one-united body.

Here, the first driving electrodes 322, the first connecting patterns 328 and the first sensing electrodes 342 may be formed on the same layer, and the second driving electrodes 324, the second sensing electrodes 344 and the second connecting patterns 348 may be formed on the same layer.

Therefore, as shown in FIG. 4A, in the first electrode layer of the touch panel, the first driving electrodes 322 and the first connecting patterns 328 are connected to each other and formed in one united body along the first direction and are spaced apart from each other along the second direction. The first sensing electrodes 342 are disposed between adjacent first connecting patterns 328 along the second direction.

Additionally, as shown in FIG. 4B, in the second electrode layer of the touch panel, the second sensing electrodes 344 and the second connecting patterns 348 are connected to each other and formed in one united body along the second direction and are spaced apart from each other along the first direction. The second driving electrodes 324 are disposed between adjacent second connecting patterns 348 along the first direction.

In an embodiment of the present invention, the second electrode layer of FIG. 4B is formed over the first electrode layer of FIG. 4A. Alternatively, the first electrode layer of FIG. 4A may be formed over the second electrode layer of FIG. 4B.

The first and second driving electrodes 322 and 324 may have the same shape and size and completely overlap each other, and the first and second sensing electrodes 342 and 344 may have the same shape and size and completely overlap each other. For convenience of illustration, the first and second driving electrodes 322 and 324 and the first and second sensing electrodes 342 and 344 are shown to be dislocated from each other.

Alternatively, the first and second driving electrodes 322 and 324 may have different sizes, and the first and second sensing electrodes 342 and 344 may have different sizes. For example, the first driving electrodes 322 and the second sensing electrodes 344 may have larger sizes than the second driving electrodes 324 and the first sensing electrodes 342.

Here, the first and second driving electrodes 322 and 324 and the first and second sensing electrodes 342 and 344 may have a substantially rhombus or diamond shape. Alternatively, the first and second driving electrodes 322 and 324 and the first and second sensing electrodes 342 and 344 may have other shapes. In addition, the outermost first and second driving electrodes 322 and 324 and the outermost first and second sensing electrodes 342 and 344 may have a triangle shape, and the outermost first and second driving electrodes 322 and 324 and the outermost first and second sensing electrodes 342 and 344 may be omitted.

Referring to FIG. 3, a plurality of first routing lines 312, a plurality of second routing lines 314 and a plurality of touch pads 316 are formed in the non-display area A2. The plurality of first routing lines 312 are connected to the driving lines 320 along the first direction, and the plurality of second routing lines 314 are connected to the sensing lines 340 along the second direction. The plurality of touch pads 316 are connected to the first and second routing lines 312 and 314.

In the touch panel of the present invention, the driving lines 320 and the sensing lines 340 form mutual capacitors. The driving lines 320 receive touch driving voltages from a touch driving unit, and the sensing lines 340 provide touch sensing voltages to the touch driving unit. When a touch of a user is performed, mutual capacitance of the mutual capacitors changes, and the touch sensing voltages vary. The touch driving unit analyzes the touch sensing voltages and detects a touch point.

In the present invention, since the driving lines 320 and the sensing lines 340 have a double-layered structure and form mutual capacitors connected in parallel, the mutual capacitance for sensing the touch increase. Accordingly, the influence of parasitic capacitance may be relatively minimized, and the touch performance may be strong against signal noises.

Moreover, the first and second driving electrodes 322 and 324 and the first and second sensing electrodes 342 and 344 are directly connected to each other, and there is no opaque conductive material such as a metallic material in the display area A1. Therefore, visibility is improved.

A cross-sectional structure of a touch panel of the present invention will be described in detail with reference to accompanying drawings.

Figure 5:
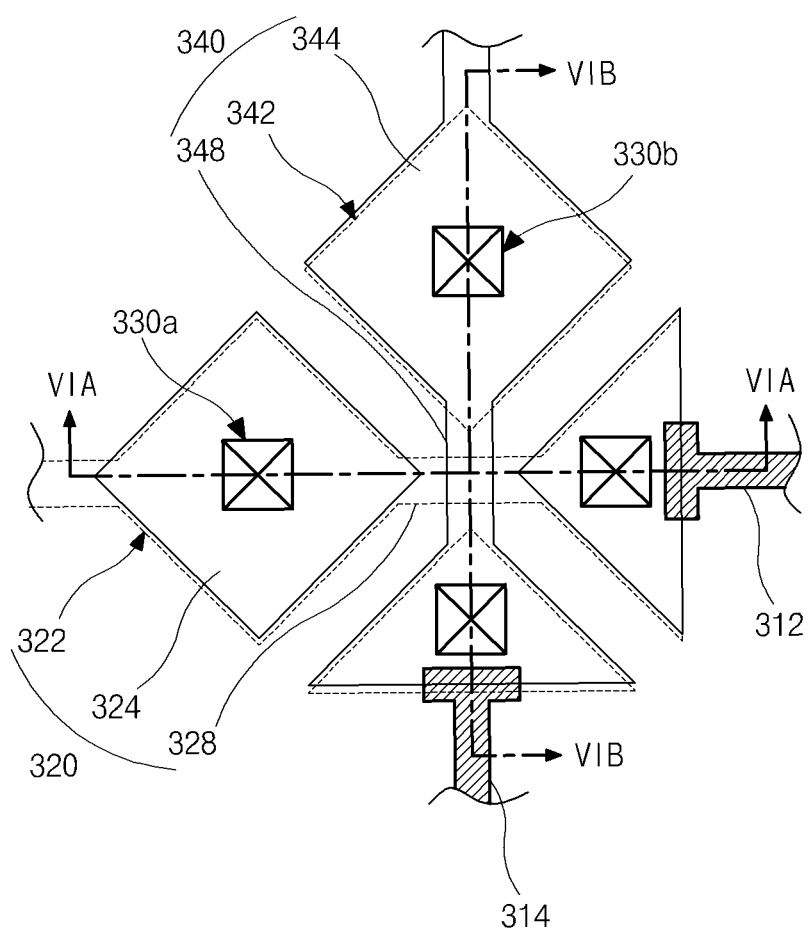
FIG. 5 is a plan view of enlarging the B area of FIG. 3.
Figure 6A:
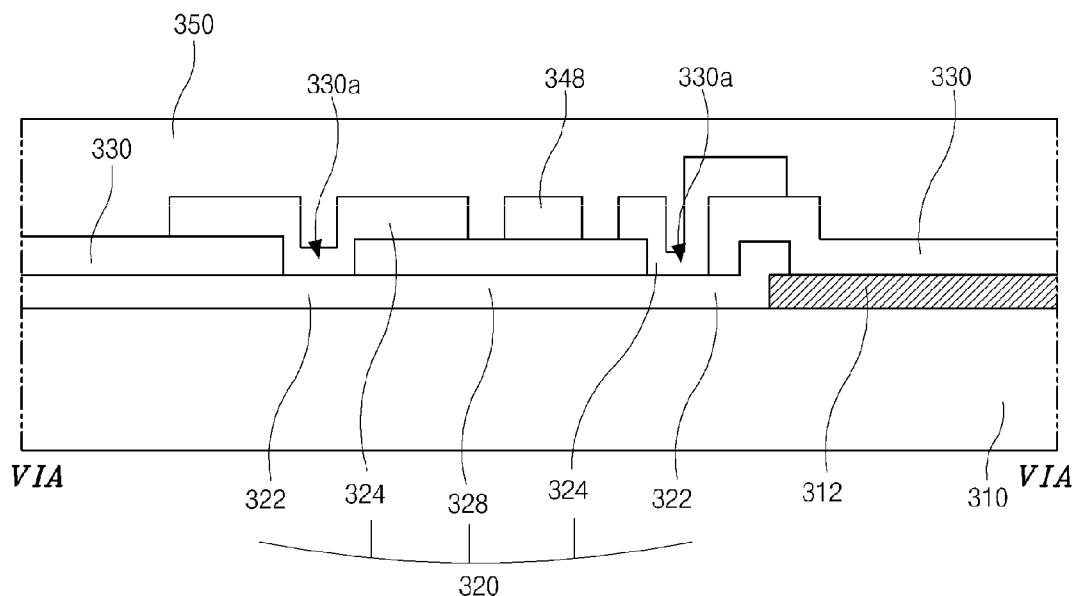
FIG. 6A is a cross-sectional view taken along the line VIA-VIA of FIG. 5.

FIG. 5 is a plan view of enlarging the B area of FIG. 3. FIG. 6A is a cross-sectional view taken along the line VIA-VIA of FIG. 5, and FIG. 6B is a cross-sectional view taken along the line VIB-VIB of FIG. 5.

Figure 6B:
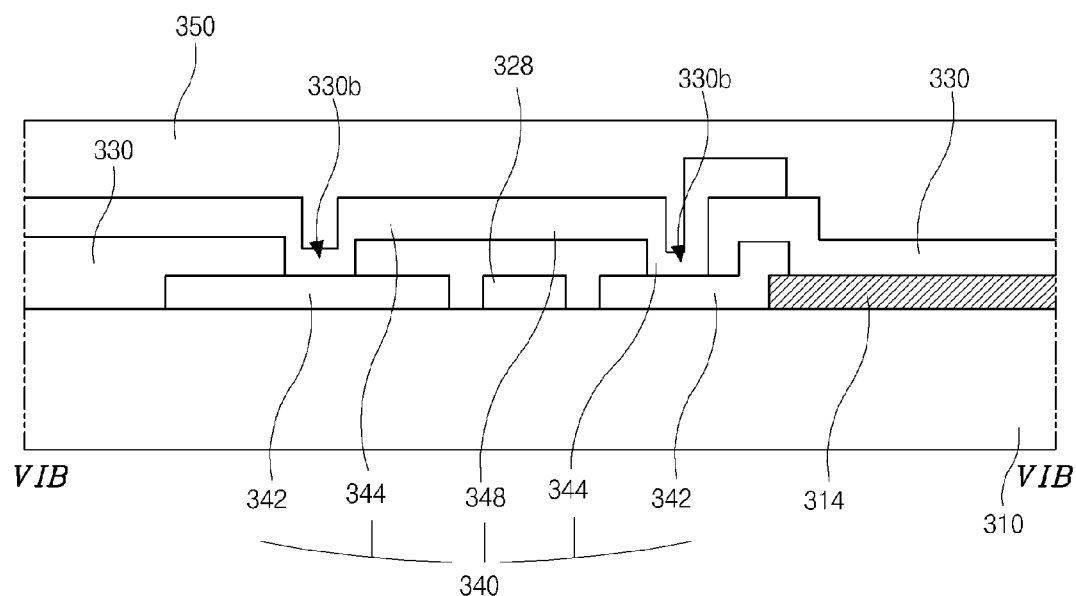
FIG. 6B is a cross-sectional view taken along the line VIB-VIB of FIG. 5.

In FIG. 5, FIG. 6A and FIG. 6B, a first routing line 312 and a second routing line 314 is formed on a substrate 310. The first routing line 312 and the second routing line 314 may be formed of a conductive material such as a metallic material. Touch pads may also be formed on the substrate 310 and connected to the first and second routing lines 312 and 314.

An insulating layer may be further formed between the substrate 310 and the first and second routing lines 312 and 314. The insulating layer may be formed of an inorganic insulating material such as silicon nitride (SiNx).

First driving electrodes 322, first connecting patterns 328 and first sensing electrodes 342 are formed on the substrate 310 including the first and second routing lines 312 and 314. The first driving electrodes 322, the first connecting patterns 328 and the first sensing electrodes 342 may be formed of a transparent conductive material. The first driving electrodes 322 and the first connecting patterns 328 may be formed in one-united body, and each of the first connecting patterns 328 is disposed between adjacent first sensing electrodes 342.

Here, the outermost first driving electrode 322 contacts the first routing line 312, and the outermost first sensing electrode 342 contacts the second routing line 314.

In addition, an insulating layer of an inorganic insulating material such as silicon oxide ($SiO_2$) or silicon nitride ($SiNx$)

may be further formed between the first routing line 312 and the first driving electrode 322 and between the second routing line 314 and the first sensing electrode 342. Also, the insulating layer includes contact holes exposing the first and second routing lines 312 and 314, respectively, and the first driving electrode 322 and the first sensing electrode 342 are connected to the first routing line 312 and the second routing line 314 through the contact holes, respectively.

A first insulating layer 330 of an insulating material is formed on the first driving electrodes 322, the first connecting patterns 328 and the first sensing electrodes 342. The first insulating layer 330 includes first contact holes 330a exposing the first driving electrodes 322 and second contact holes 330b exposing the first sensing electrodes 342.

Second driving electrodes 324, second sensing electrodes 344 and second connecting patterns 348 of a transparent conductive material can be formed on the first insulating layer 330. The second sensing electrodes 344 and the second connecting patterns 348 are formed in one united body, and each of the second connecting patterns 348 is disposed between adjacent second driving electrodes 324.

The second driving electrodes 324 contact the first driving electrodes 322 through the first contact holes 330a, and the second sensing electrodes 344 contact the first sensing electrodes 342 through the second contact holes 330b.

Therefore, the first driving electrodes 322, the first connecting patterns 328 and the second driving electrodes 324 form a driving line 320, and the first sensing electrodes 342, the second sensing electrodes 344 and the second connecting patterns 348 form a sensing line 340.

A second insulating layer 350 is formed on the second driving electrodes 324, the second sensing electrodes 344 and the second connecting pattern 348 and protects layers thereunder.

A method of fabricating a touch panel according to an embodiment of the present invention will be described with reference to accompanying drawings.

FIGS. 7A to 7D are plan views schematically illustrating a touch panel in respective steps of a method of fabricating the same according to an embodiment of the present invention. FIGS. 8A to 8D and FIGS. 9A to 9D are cross-sectional views schematically illustrating a touch panel in respective steps of a method of fabricating the same according to an embodiment of the present invention. FIGS. 8A to 8D correspond to the line VIA-VIA of FIG. 5, and FIGS. 9A to 9D correspond to the line VIB-VIB of FIG. 5.

Figure 7A:
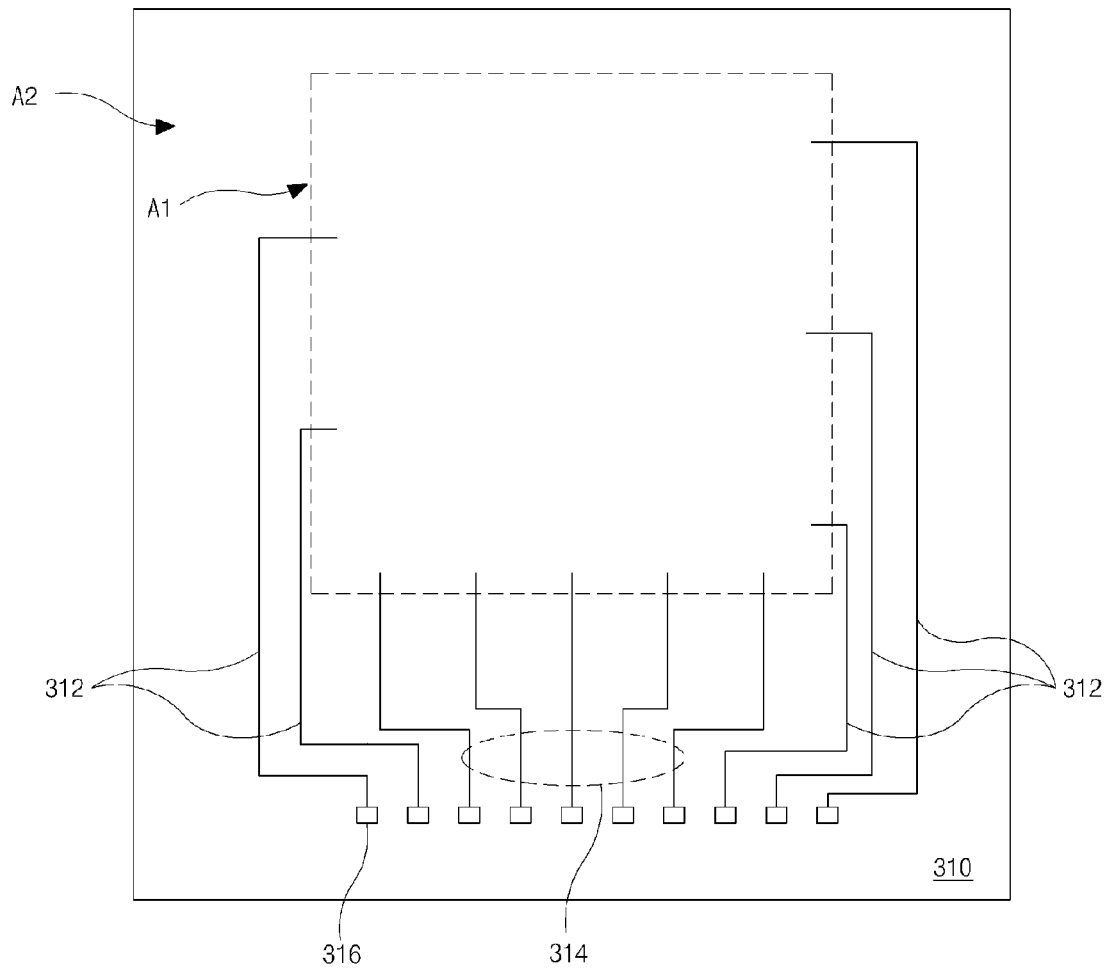
FIGS. 7A to 7D are plan views illustrating a touch panel in respective steps of a method of fabricating the same according to an embodiment of the present invention.
Figure 8A:
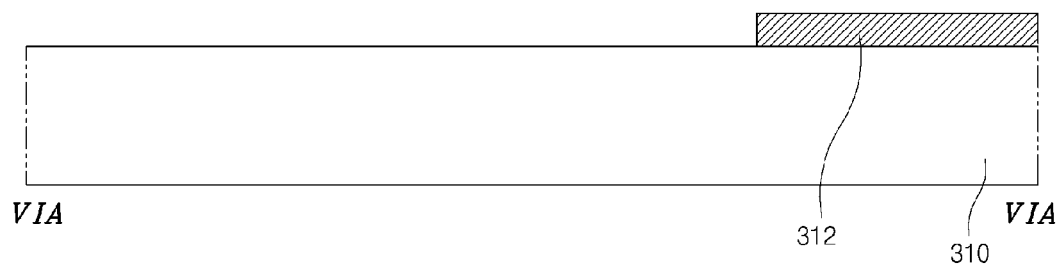
FIGS. 8A to 8D and FIGS. 9A to 9D are cross-sectional views illustrating a touch panel in respective steps of a method of fabricating the same according to an embodiment of the present invention.
Figure 9A:
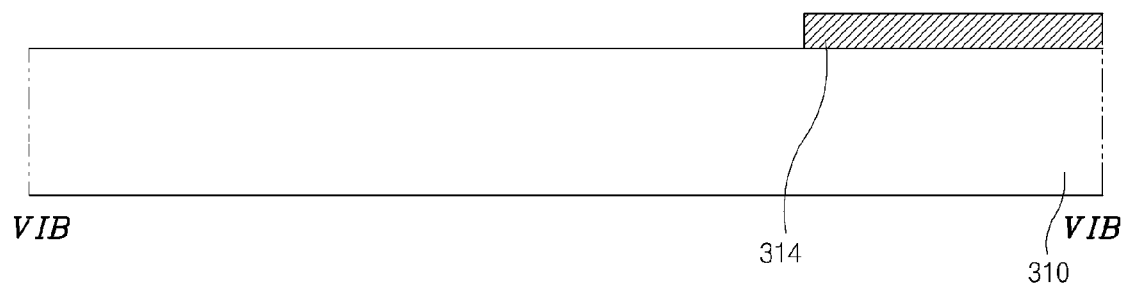

In FIG. 7A, FIG. 8A and FIG. 9A, a conductive material is deposited on a substantially entire surface of a substrate 310, where a display area A1 and a non-display area A2 are defined, and patterned, thereby forming first routing lines 312, second routing lines 314 and touch pads 316 in the non-display area A2.

Here, the substrate 310 may be formed of glass, plastic such as polyethylene terephthalate (PET), or polyimide. The first routing lines 312, the second routing lines 314 and the touch pads 316 may be formed of one or more metallic materials such as aluminum (Al), molybdenum (Mo), titanium (Ti) or alloy thereof and may have a single-layered or multi-layered structure.

First ends of the first routing lines 312 and the second routing lines 314 extend into the display area A1, and second ends of the first routing lines 312 and the second routing lines 314 are connected to the touch pads 316.

Figure 7B:
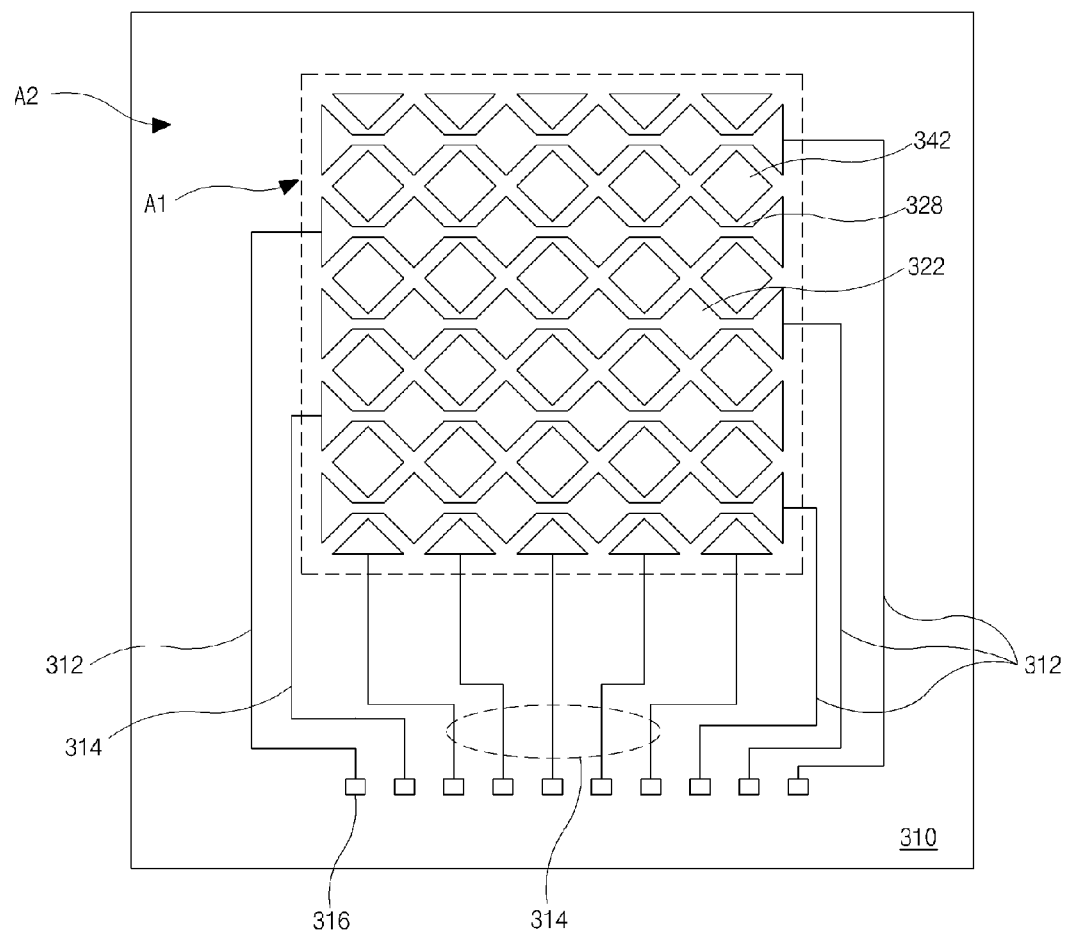
Figure 8B:
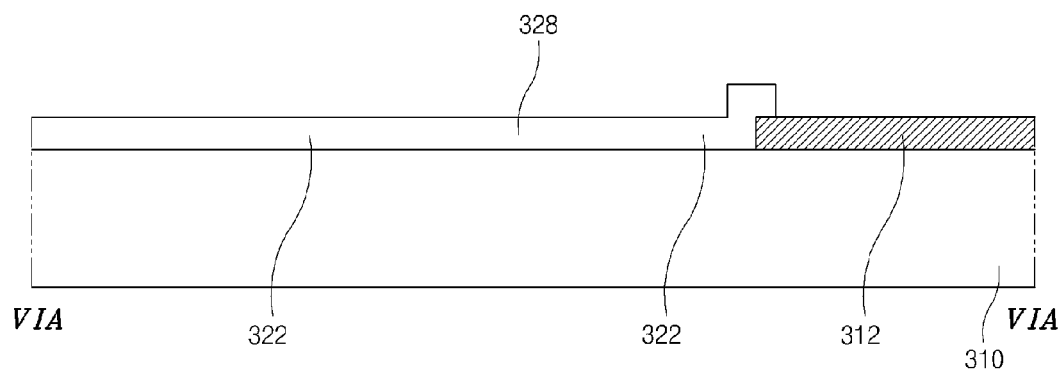
Figure 9B:
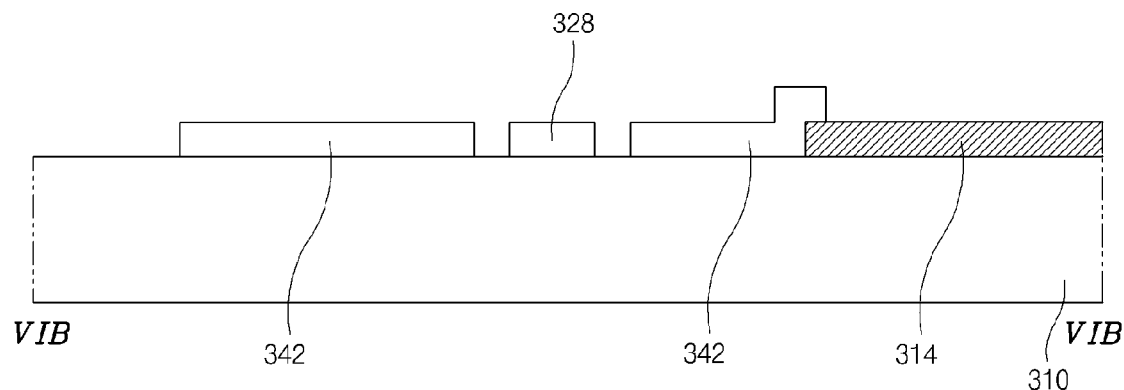

Next, in FIG. 7B, FIG. 8B and FIG. 9B, a transparent conductive material is deposited on a substantially entire surface of the substrate 310 including the first routing lines 312, the second routing lines 314 and the touch pads 316 and then patterned, thereby forming first driving electrodes 322, first connecting patterns 328 and first sensing electrodes 342 in the display area A1.

Each of the first connecting patterns 328 connects adjacent first driving electrodes 322 along a first direction, and each of the first sensing electrodes 342 is formed between adjacent first connecting patterns 328 along a second direction.

The first driving electrodes 322 and the first sensing electrodes 342 have a substantially rhombus or diamond shape. Alternatively, the first driving electrodes 322 and the first sensing electrodes 342 may have another shape such as a square, rectangular or polygonal shape.

Here, the outermost first driving electrodes 322 partially overlap and contact the first routing lines 312, and the outermost first sensing electrodes 342 partially overlap and contact the second routing lines 314.

The first driving electrodes 322, the first connecting patterns 328 and the first sensing electrodes 342 may be formed of a transparent conductive material such as indium tin oxide or indium zinc oxide.

Figure 7C:
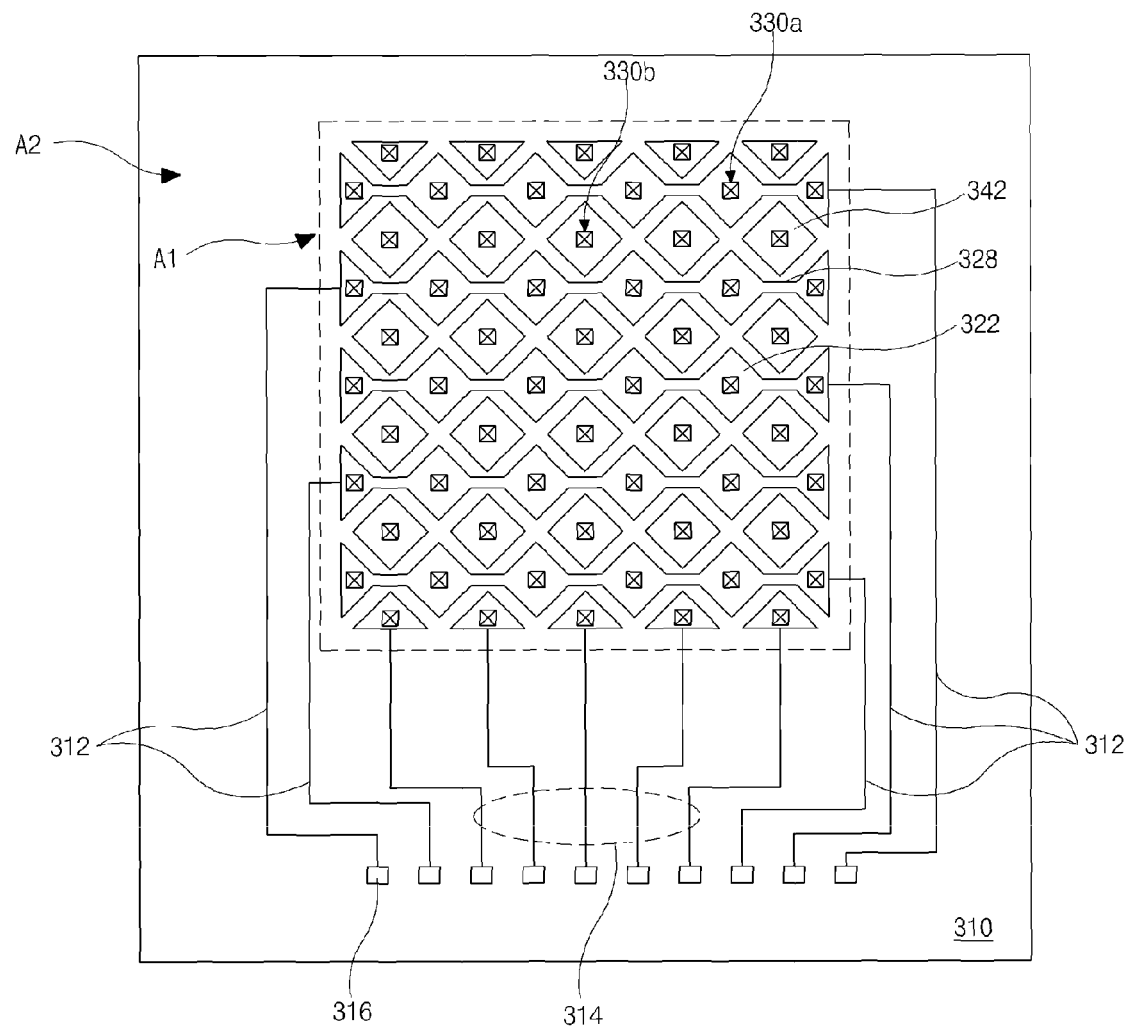
Figure 8C:
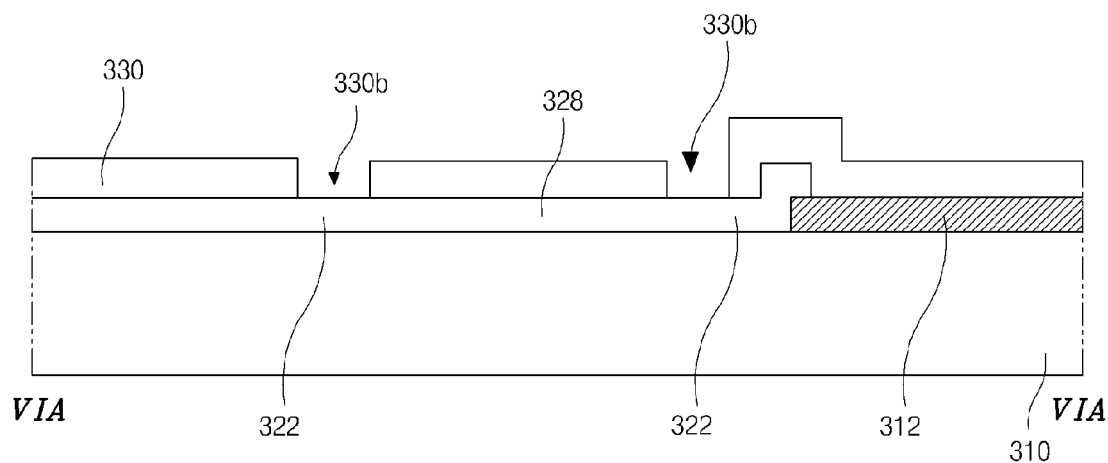
Figure 9C:
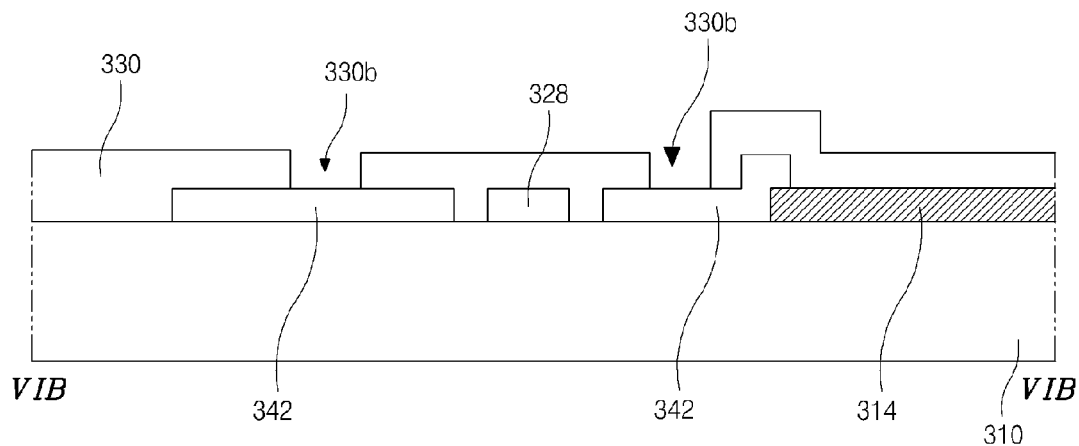

Next, in FIG. 7C. FIG. 8C and FIG. 9C, a first insulating layer 330 is formed over the substrate 310 by depositing an insulating material on the first driving electrodes 322, the first connecting patterns 328 and the first sensing electrodes 342. Then, the first insulating layer 330 is patterned, thereby forming first contact holes 330a and second contact holes 330b. The first contact holes 330a expose the first driving electrodes 322, and the second contact holes 330b expose the first sensing electrodes 342.

Here, the first insulating layer 330 may be formed of an inorganic insulating material such as silicon oxide ($SiO_2$) or silicon nitride ($SiN_x$).

Figure 7D:
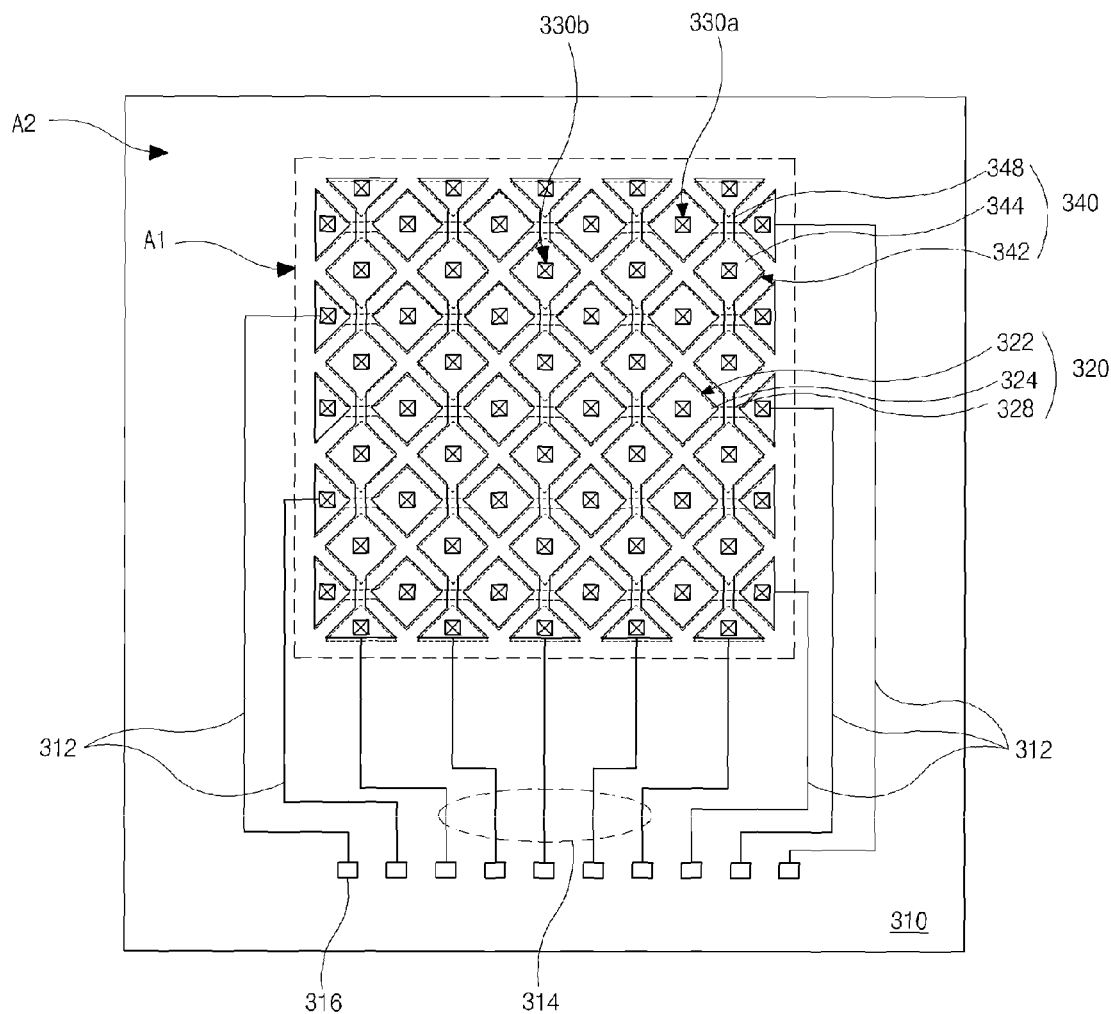
Figure 8D:
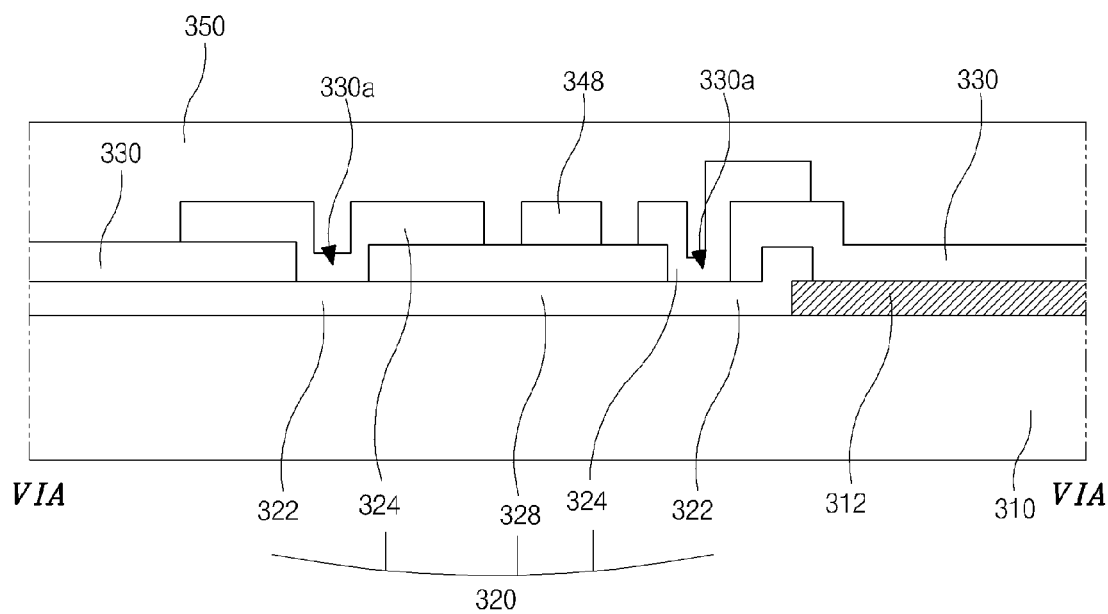
Figure 9D:
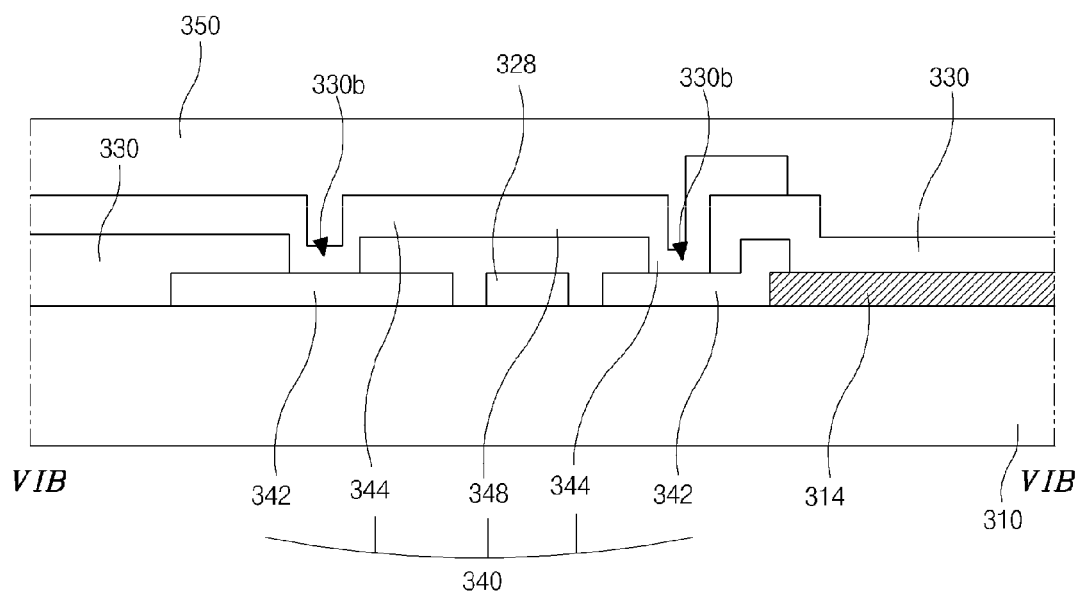

In FIG. 7D, FIG. 8D and FIG. 9D, a transparent conductive material is formed on the first insulating layer 330 over the substrate 310 and then patterned, thereby forming second driving electrodes 324, second sensing electrodes 344 and second connecting patterns 348 in the display area A1.

The second driving electrodes 324 overlap the first driving electrodes 322, respectively, and the second sensing electrodes 344 overlap the first sensing electrodes 342, respectively. The second connecting patterns cross the first connecting patterns, respectively.

Each of the second connecting patterns 348 connects adjacent second sensing electrodes 344 along the second direction and is formed of one united body with the adjacent second sensing electrodes 344. Each of the second driving electrodes 324 is disposed between adjacent second connecting patterns 348 along the first direction.

The second driving electrodes 324 and the second sensing electrodes 344 have a substantially rhombus or diamond shape. Alternatively, the second driving electrodes 324 and the second sensing electrodes 344 may have another shape such as a square, rectangular or polygonal shape.

The second driving electrodes 324, the second sensing electrodes 344 and the second connecting patterns 348 may be formed of a transparent conductive material such as indium tin oxide or indium zinc oxide.

Then, a second insulating layer 350 is formed by depositing an insulating material on the second driving electrodes 324, the second sensing electrodes 344 and the second connecting patterns 348 over the substrate 310. The second insulating layer 350 may be formed by depositing an inorganic insulating material such as silicon oxide ($SiO_2$) or silicon nitride ($SiN_x$) or by applying an organic insulating material such as benzocyclobutene (BCB) or photo acryl.

Here, the second insulating layer 350 may have one or more contact holes exposing the touch pads 316.

In the present invention, the first routing lines 312 and the second routing lines 314 may be formed on the same layer. Alternatively, the first routing lines 312 and the second routing lines 314 may be formed on different layers.

Meanwhile, conductive patterns may be further formed on the second insulating layer 350 to disperse parasitic capacitance. This will be described with reference to FIG. 10A and FIG. 10B.

Figure 10A:
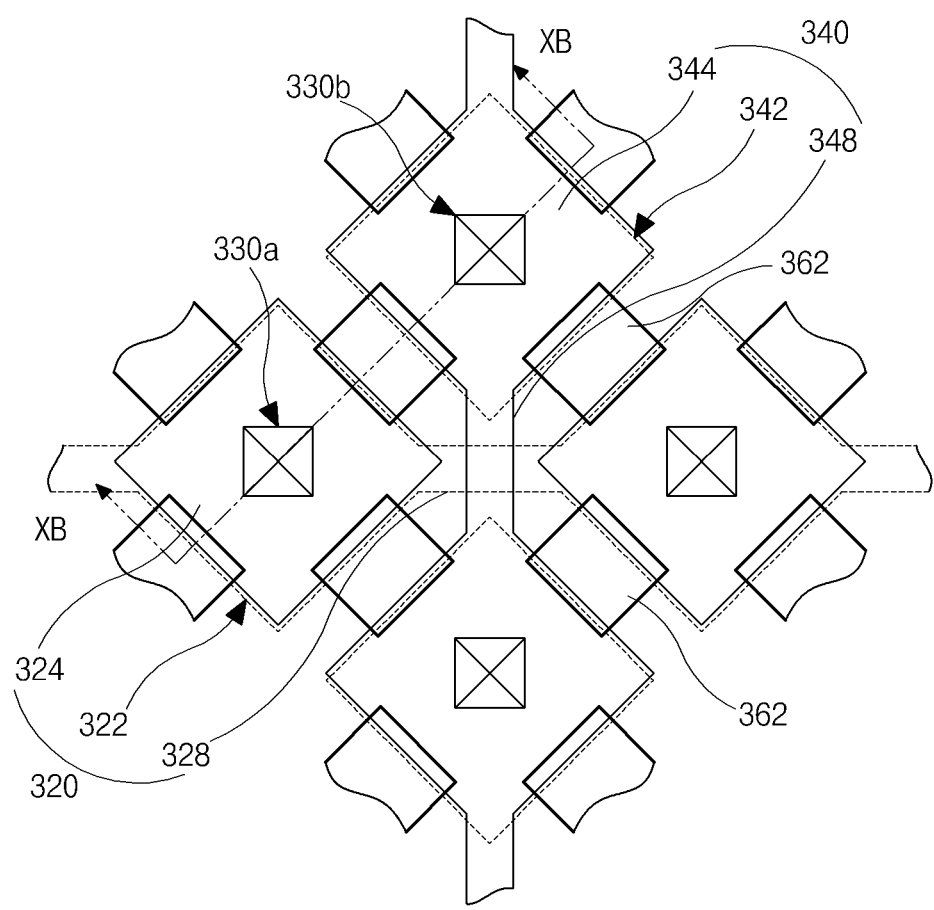
FIG. 10A is an enlarged plan view illustrating a touch panel according to an embodiment of the present invention.
Figure 10B:
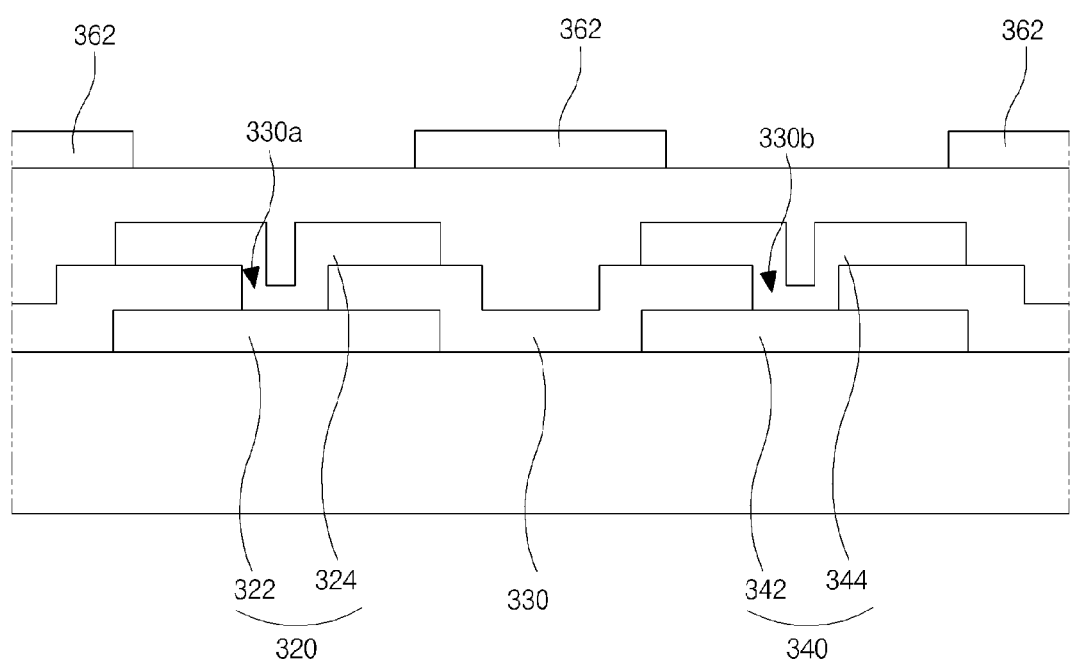
FIG. 10B is a cross-sectional view taken along the line XB-XB of FIG. 10A.

FIG. 10A is an enlarged plan view of schematically illustrating a touch panel according to an embodiment of the present invention, and FIG. 10B is a cross-sectional view taken along the line XB-XB of FIG. 10A. The structure of the touch panel except for conductive patterns is the same as that of the above-mentioned example. The same references will be used for the same parts, and explanation for the same parts will be omitted or simplified.

In FIG. 10A and FIG. 10B, first driving electrodes 322, first connecting patterns 328 and first sensing electrodes 342 of a transparent conductive material are formed on a substrate 310. The first connecting patterns 328 are connected to the first driving electrodes 322 adjacent thereto along a first direction and are formed in one-united body with the first driving electrodes 322.

A first insulating layer 330 of an insulating material is formed on the first driving electrodes 322, the first connecting patterns 328 and the first sensing electrodes 342. The first insulating layer 330 includes first contact holes 330a exposing the first driving electrodes 322 and second contact holes 330b exposing the first sensing electrodes 342.

Second driving electrodes 324, second sensing electrodes 344 and second connecting patterns 348 of a transparent conductive material are formed on the first insulating layer 330. The second connecting patterns 348 are connected to the second sensing electrodes 344 adjacent thereto along a second direction and are formed in one united body with the second sensing electrodes 344. The second connecting patterns 348 cross the first connecting patterns 328, respectively. The second driving electrodes 324 overlap the first driving electrodes 322 and contact the first driving electrodes 322 through the first contact holes 330a to thereby form a driving line 320. The second sensing electrodes 344 overlap the first sensing electrodes 342 and contact the first sensing electrodes 342 through the second contact holes 330b to thereby form a sensing line 340.

A second insulating layer 350 is formed on the second driving electrodes 324, the second sensing electrodes 344 and the second connecting patterns 348 and protects the layers thereunder.

Conductive patterns 362 of a transparent conductive material are formed on the second insulating layer 350. Some of the conductive patterns 362 are disposed between the second driving electrode 324 and the second sensing electrode 344 adjacent to each other along a third direction and overlap the second driving electrode 324 and the second sensing electrode 344 adjacent to each other along the third direction. Others of the conductive patterns 362 are disposed between the second driving electrode 324 and the second sensing electrode 344 adjacent to each other along a fourth direction crossing the third direction and overlap the second driving electrode 324 and the second sensing electrode 344 adjacent to each other along the fourth direction. The third and fourth directions cross the first and second directions.

The conductive patterns 362 are disposed between the second electrode 178 of the display panel 100 and the driving and sensing lines 320 and 340 of the touch panel 300 in the touch display device of FIG. 2 and disperse parasitic capacitance. Therefore, the touch performance is improved.

In an embodiment of the present invention, a top emission type organic light-emitting diode display device is used as the display panel 100 of FIG. 2. Alternatively, a bottom emission type organic light-emitting diode display device may be used as the display panel 100 of FIG. 2, or a liquid crystal display device may be used as the display panel 100 of FIG. 2.

In the mutual capacitance type touch panel of the present invention, each of the driving lines and the sensing lines includes electrodes overlapping and connected to each other, and mutual capacitors are connected in parallel. Accordingly, the influence of the parasitic capacitance is minimized, and the touch performance is strong against signal noise.

In addition, since the electrodes of the driving lines and the sensing lines are directly connected to each other, there is no opaque conductive material in the display area. Thus, the visibility is improved.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A touch panel, comprising:
a substrate;
driving lines on the substrate along a first direction, each of the driving lines including first driving electrodes, second driving electrodes and first connecting patterns;
sensing lines on the substrate along a second direction, each of the sensing lines including first sensing electrodes, second sensing electrodes and second connecting patterns;
a first insulating layer covering the first driving electrodes, the first connecting patterns and the first sensing electrodes and having first contact holes exposing the first driving electrodes and second contact holes exposing the first sensing electrodes;
a second insulating layer covering the second driving electrodes, the second connecting patterns and the second sensing electrodes; and
conductive patterns on the second insulating layer and overlapping the second driving electrodes or the second sensing electrodes adjacent thereto,
wherein the second driving electrodes contact the first driving electrodes through the first contact holes, respectively, and the second sensing electrodes contact the first sensing electrodes through the second contact holes, respectively,
wherein each of the first connecting patterns connects the first driving electrodes adjacent thereto, and the second driving electrodes overlap and contact the first driving electrodes, and
wherein each of the second connecting patterns connects the second sensing electrodes adjacent thereto, and the second sensing electrodes overlap and contact the first sensing electrodes.

2. The touch panel of claim 1, wherein the first connecting patterns cross the second connecting patterns, respectively.

3. The touch panel of claim 1, further comprising first routing lines and second routing lines on the substrate, each of the first routing lines contacting one of the first driving electrodes, and each of the second routing lines contacting one of the first sensing electrodes.

4. The touch panel of claim 1, wherein the driving lines and the sensing lines are formed of a transparent conductive material.

5. The touch panel of claim 1, wherein the first driving electrodes and the first connecting patterns form one-united body.

6. The touch panel of claim 1, wherein the second sensing electrodes and the second connecting patterns form one-united body.

7. The touch panel of claim 1, wherein the first driving electrodes, the first connecting patterns and the first sensing electrodes are formed as a first layer, and the second driving electrodes, the second connecting patterns and the second sensing electrodes are formed as a second layer.

8. The touch panel of claim 1, wherein the conductive patterns are disposed between an electrode of a light-emitting diode and the driving and sensing lines.

9. A method of fabricating a touch panel, the method comprising:
    forming first driving electrodes, first sensing electrodes, and first connecting patterns on a substrate;
    forming a first insulating layer on the first driving electrodes, the first sensing electrodes and the first connecting patterns, the first insulating layer including first contact holes exposing the first driving electrodes and second contact holes exposing the first sensing electrodes;
    forming second driving electrodes, second sensing electrodes and second connecting patterns on the first insulating layer;
    forming a second insulating layer on the second driving electrodes, the second sensing electrodes and the second connecting patterns; and
    forming conductive patterns on the second insulating layer, the conductive patterns overlapping the second driving electrodes or the second sensing electrodes adjacent thereto,
    wherein each of the first connecting patterns connects adjacent first driving electrodes along a first direction, and the second driving electrodes overlap and contact the first driving electrodes, and
    wherein each of the second connecting patterns connects adjacent second sensing electrodes along a second direction, and the second sensing electrodes overlap and contact the first sensing electrodes.

10. The method of claim 9, further comprising:
    forming first routing lines on the substrate, each of the first routing lines contacting one of the first driving electrodes; and
    forming second routing lines on the substrate, each of the second routing lines contacting one of the first sensing electrodes.

11. The method of claim 10, wherein the step of forming the first routing lines and the step of forming the second routing lines are performed before forming the first driving electrodes, the first sensing electrodes, and the first connecting patterns.

12. The method of claim 9, wherein the first connecting patterns cross the second connecting patterns, respectively.

13. The method of claim 9, wherein the first driving electrodes and the first connecting patterns are formed in one-united body.

14. The method of claim 9, wherein the second sensing electrodes and the second connecting patterns are formed in one-united body.

15. The method of claim 9, wherein the first driving electrodes, the first connecting patterns and the first sensing electrodes are formed as a first layer, and the second driving electrodes, the second connecting patterns and the second sensing electrodes are formed as a second layer, and
    wherein the first and second layers are separately formed and the first and second driving electrodes contact each other through the first contact holes, and the first and second sensing electrodes contact each other through the second contact holes.

16. The method of claim 9, wherein the conductive patterns are disposed between an electrode of a light-emitting diode and the driving and sensing lines.

* * * * *